US007670037B2

(12) United States Patent
Devir et al.

(10) Patent No.: US 7,670,037 B2
(45) Date of Patent: Mar. 2, 2010

(54) BENDING BEAM HEADLAMP WITH MULTI-FILAMENT BULB

(75) Inventors: Daniel D. Devir, South Sutton, NH (US); Thomas Tessnow, Weare, NH (US); Michael Tucker, Henniker, NH (US); Joseph L. Wegman, Henniker, NH (US); Andreas Osten, Berlin (DE); Craig Landcastle, Henniker, NH (US)

(73) Assignee: Osram Sylvania Inc., Danvers, MA (US)

( * ) Notice: Subject to any disclaimer, the term of this patent is extended or adjusted under 35 U.S.C. 154(b) by 174 days.

(21) Appl. No.: 11/904,890

(22) Filed: Sep. 28, 2007

(65) Prior Publication Data

US 2009/0086501 A1 Apr. 2, 2009

(51) Int. Cl.

| | |
|---|---|
| ***B60Q 1/00*** | (2006.01) |
| ***F21K 2/00*** | (2006.01) |
| ***H01K 9/00*** | (2006.01) |
| ***H01J 5/00*** | (2006.01) |

(52) U.S. Cl. ....................... 362/464; 362/211; 362/212; 362/519; 313/317; 313/316

(58) Field of Classification Search ................. 362/211, 362/212, 464, 519; 313/316, 317
See application file for complete search history.

(56) References Cited

U.S. PATENT DOCUMENTS

| | | | | |
|---|---|---|---|---|
| 1,793,398 | A * | 2/1931 | Hamberger | 313/115 |
| 2,146,593 | A | 2/1939 | Roper | |
| 2,214,472 | A | 9/1940 | Lund | |
| 3,886,400 | A * | 5/1975 | Dill | 315/64 |
| 4,638,408 | A * | 1/1987 | Wetherington | 362/544 |
| 6,955,439 | B2 | 10/2005 | Reismiller et al. | |

* cited by examiner

*Primary Examiner*—Stephen F Husar
*Assistant Examiner*—James W Cranson
(74) *Attorney, Agent, or Firm*—Edward S. Podszus

(57) ABSTRACT

An automotive headlamp bulb provides the two light or three filament sources in a single bulb. One source may be used to generate a standard headlamp beam, while the second source may be used to generate an augmenting side beam in response to a turning signal. A similar third filament may provide an augmenting beam to the opposite side, or farther to the same side. The single bulb eliminates the need for a second bulb, or a second reflector in an advanced headlamp system with turning light augmentation.

27 Claims, 6 Drawing Sheets

BENDING BEAM HEADLAMP WITH MULTI-FILAMENT BULB

CROSS-REFERENCE TO RELATED APPLICATIONS not applicable

BACKGROUND OF THE INVENTION

1. Field of the Invention

The invention relates to electric lamps and particularly to electric lamps. More particularly the invention is concerned with lamps with a plurality of enclosed filaments.

2. Description of the Related Art Including Information Disclosed Under 37 CFR 1.97 and 1.98

Advanced forward lighting headlamp systems (AFS) are being developed to light the road on the side a vehicle is turning to. The first AFS headlamp systems used one lamp and one reflector or projector lens. The beam control was achieved by rotating the entire lamp to the right or left with a stepper motor. This is a mechanically complex and expensive system. Alternative systems were devised using a first lamp to generate a forward beam and a second lamp to generate an augmenting side beam in response to a turning signal. By tuning between the two sources one can aim the beam. The two lamp AFS systems may use either or both two light sources, and two reflectors. The cost of the extra material for the lamps and the reflectors, the space and volume for the second lamp, and the additional labor in mounting, and aiming the duplicative systems makes the enhanced lighting system expensive.

BRIEF SUMMARY OF THE INVENTION

An incandescent lamp capsule may be made with an envelope having a light transmissive wall defining an enclosed volume, and a lamp axis. A first filament is positioned in the enclosed volume having a first filament axis. The first filament is oriented so the first filament axis is in an axial plane parallel with the lamp axis. A second filament is also positioned in the enclosed volume, defining a second filament axis. The second filament is oriented so the second filament axis is in the axial plane; and the second filament axis is not parallel to the first filament axis. A third filament is positioned in the enclosed volume, defining a third filament axis. The third filament is oriented so the third filament axis is in the axial plane with the first filament axis and the second filament axis. The third filament axis is not parallel to the first filament axis, and the third filament axis is not parallel to the second filament axis.

DETAILED DESCRIPTION OF THE INVENTION

Figure 1:
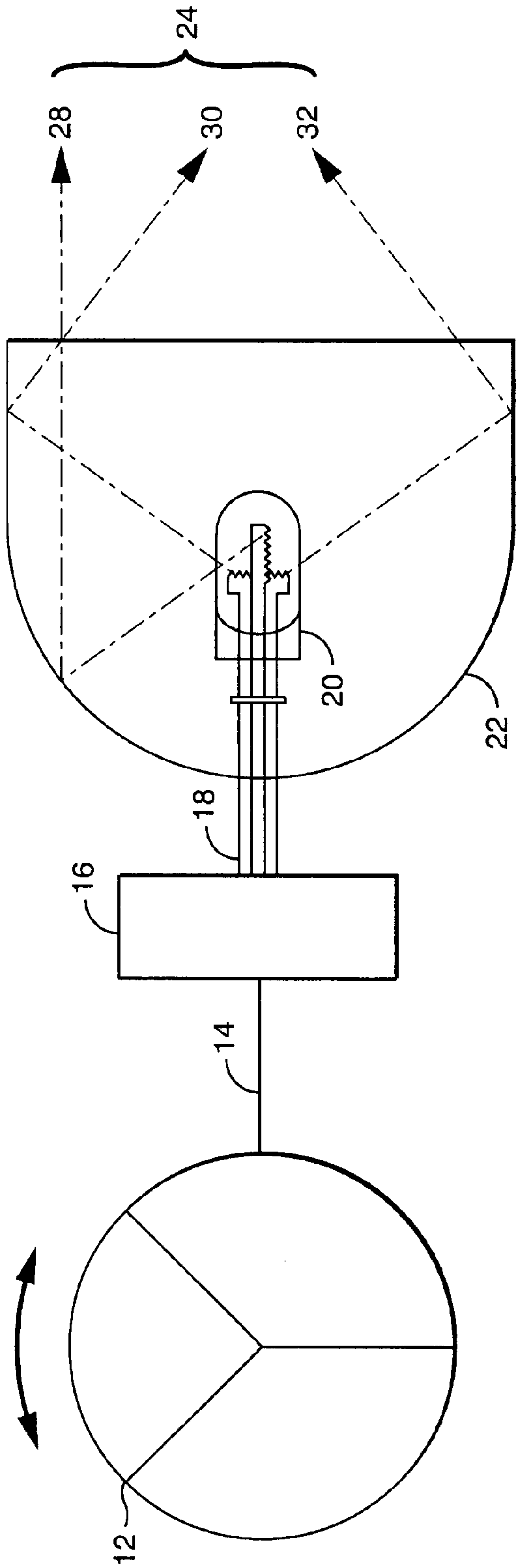
FIG. 1 shows a schematic view of an advanced forward lighting system.
Figure 2:
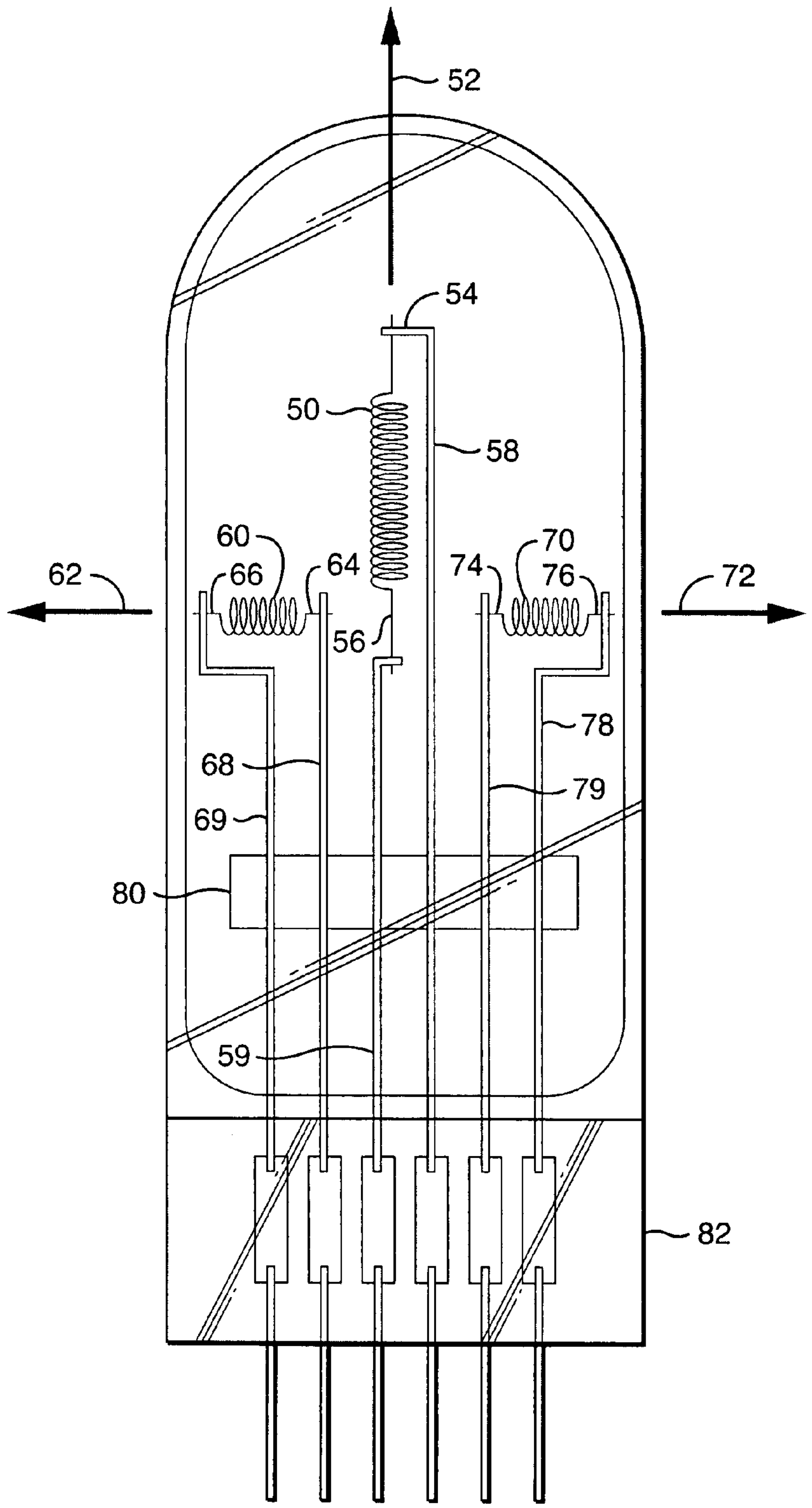
FIG. 2 shows a schematic view of a preferred embodiment of a bending beam headlamp with a multi-filament bulb.

FIG. 1 shows a schematic view of an advanced forward lighting system 10. FIG. 2 shows a schematic view of a preferred embodiment of a bending beam headlamp with a multi-filament bulb. A steering device 12 provides a signal 14 indicating desired movement of a vehicle relative to the road. The steering signal 14 is used by a controller 16 to alter the power supplied 18 to an improved lamp capsule 20 held in a reflector 22 directing light into a beam pattern 24. The lamp capsule 20 has a first filament 50 to generate a forward beam pattern 28. The lamp capsule 20 also has a second filament 60 to generate augmenting a first (right) side illumination 32. The lamp capsule 20 may also have a third filament 70 to generate augmenting second (left) side illumination 30.

FIG. 2 shows a perspective view of a preferred embodiment of a bending beam headlamp with multi-filament capsule. The lamp includes an envelope with a light transmissive wall, defining an enclosed volume. In the enclosed volume is a plurality of filaments. The lamp is generally used with a reflector. The reflector 22 may be any of numerous headlamp reflectors. In particular, the reflector 22 may be a hollow, plastic shell with an aluminized interior surface shaping the light from the lamp into a vehicle headlamp beam.

Enclosed in the envelope volume is a first filament 50 extending along a first axis 52. The first filament 50 may be a straight wire extending as the axis 52; a wire coiled around the axis 52, a coiled coil extending along the axis 52, or similarly formed linearly extending filament structure. In general, the first filament 50 is linearly extended along the first axis 52, and is symmetrically disposed about the first axis 52, to form an approximately cylindrical filament structure. The first filament has a first electrical connection 54 and a second electrical connection 56. The first filament is mechanically and electrically supported between a first support 58 and a second support 59.

Enclosed in the volume is a second filament 60 extending along a second axis 62. The second filament 60 may also be a straight wire extending as the second axis 62, a wire coiled around the second axis 62, a coiled coil extending along the second axis 62, and so on in the same pattern. In general, the second filament 60 is linearly extended along the second axis 62, and is symmetrically disposed about the second axis 62. The first axis 52 and the second axis 62 are in a common plane, but are not parallel. The second filament 60 then extends in a common plane (Actually the filaments are in a common parallel planar slice that is co-planar with their respective axes. The slice has a width equal to the filament diameter, but for convenience the filaments will be said to be "parallel" or in a common plane.) with the first filament 50, but in a direction with at least a component direction that is perpendicular to the first axis 52. The second filament has a first electrical connection 64 and a second electrical connection 66. The right side filament 60 is coupled mechanically and electrically between the third support 68 and a fourth support 69. In one preferred embodiment, the right side filament 60 forms a right angle with the first filament 50 at the rear end of the first filament 50. The second filament 60 is then substantially behind the first filament 50 (closer to the base 82), minimizing interference with the function of the first filament 50.

Enclosed in the volume is a third filament 70 extending along a third axis 72. The third filament 70 may also be a straight wire extending as the third axis 72, a wire coiled around the third axis 72, a coiled coil extending along the third axis 72, and so on in the same pattern. In general, the third filament 70 is linearly extended along the third axis 72, and is symmetrically disposed about the third axis 72. The first axis 52 and the third axis 72 are in a common plane but are not parallel. The third filament 70 then extends in a common plane (actually in a planar slice with a width of the filament diameter) with the first filament 50, but in a direction with at least a component direction that is perpendicular to the first axis 50. The third filament 70 has a first electrical connection 74 and a second electrical connection 76. The left side filament is coupled mechanically and electrically between the fifth support 78 and a sixth support 79. The third filament 70 may form a right angle with the first filament 50 at the rear end of the first filament 56. The third filament 70 is then substantially behind the first filament 50 (closer to the base 82) minimizing interference with the function of the first filament 50.

The first support 58, second support 59, third support 68, fourth support 69, fifth support 78, sixth support 79 may be captured in a glass bridge 80, and then extended through a press sealed end 82 of the lamp envelope for electrical connection on the lamp exterior. The second support 59, fourth support 69 and sixth support 79 may be combined (pairwise or as a triple) to form a single support (common electrical supply).

Figure 3:
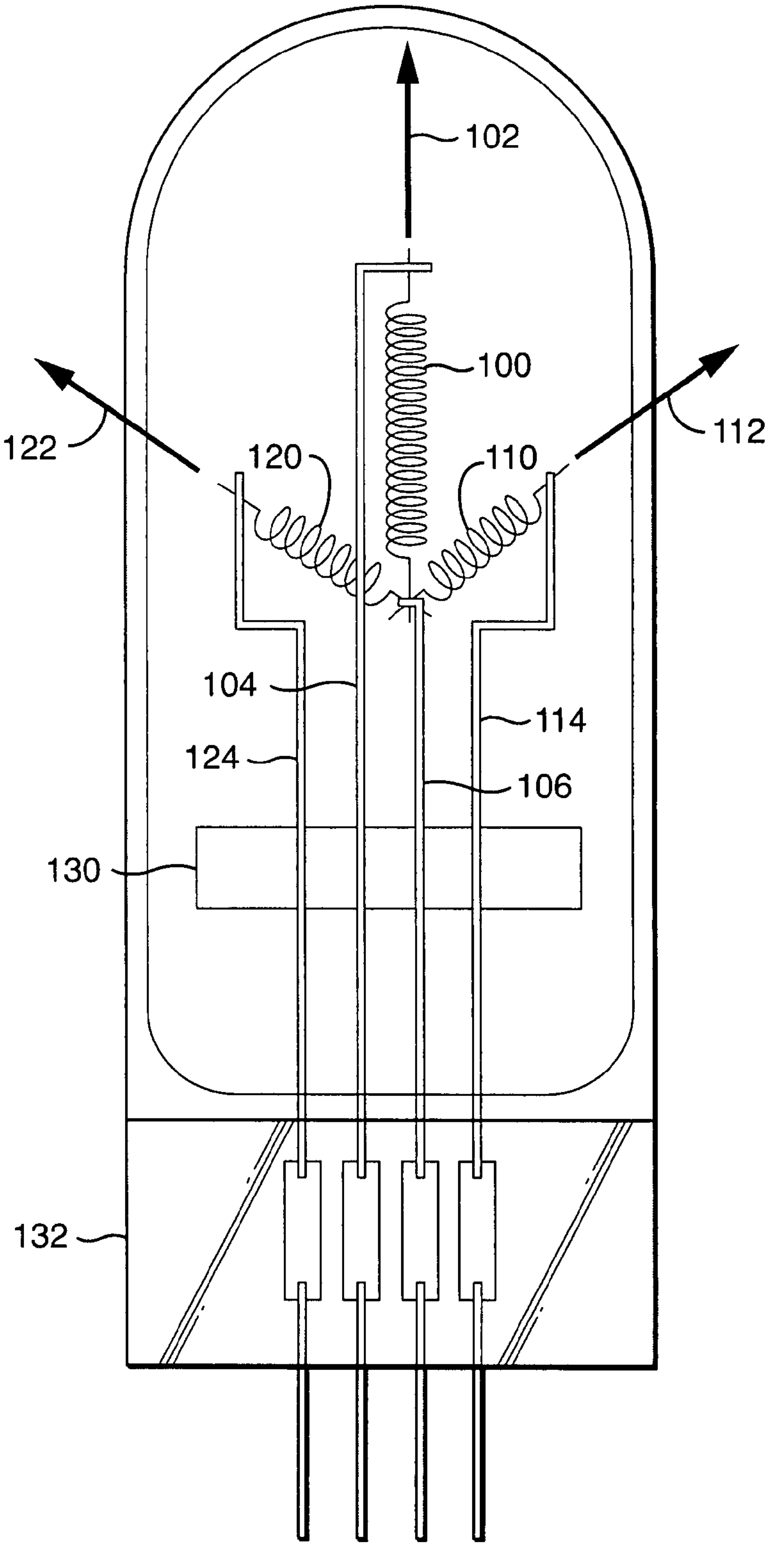
FIG. 3 shows a schematic view of a preferred embodiment of an alternative multi-filament arrangement for a bending beam headlamp.
Figure 4:
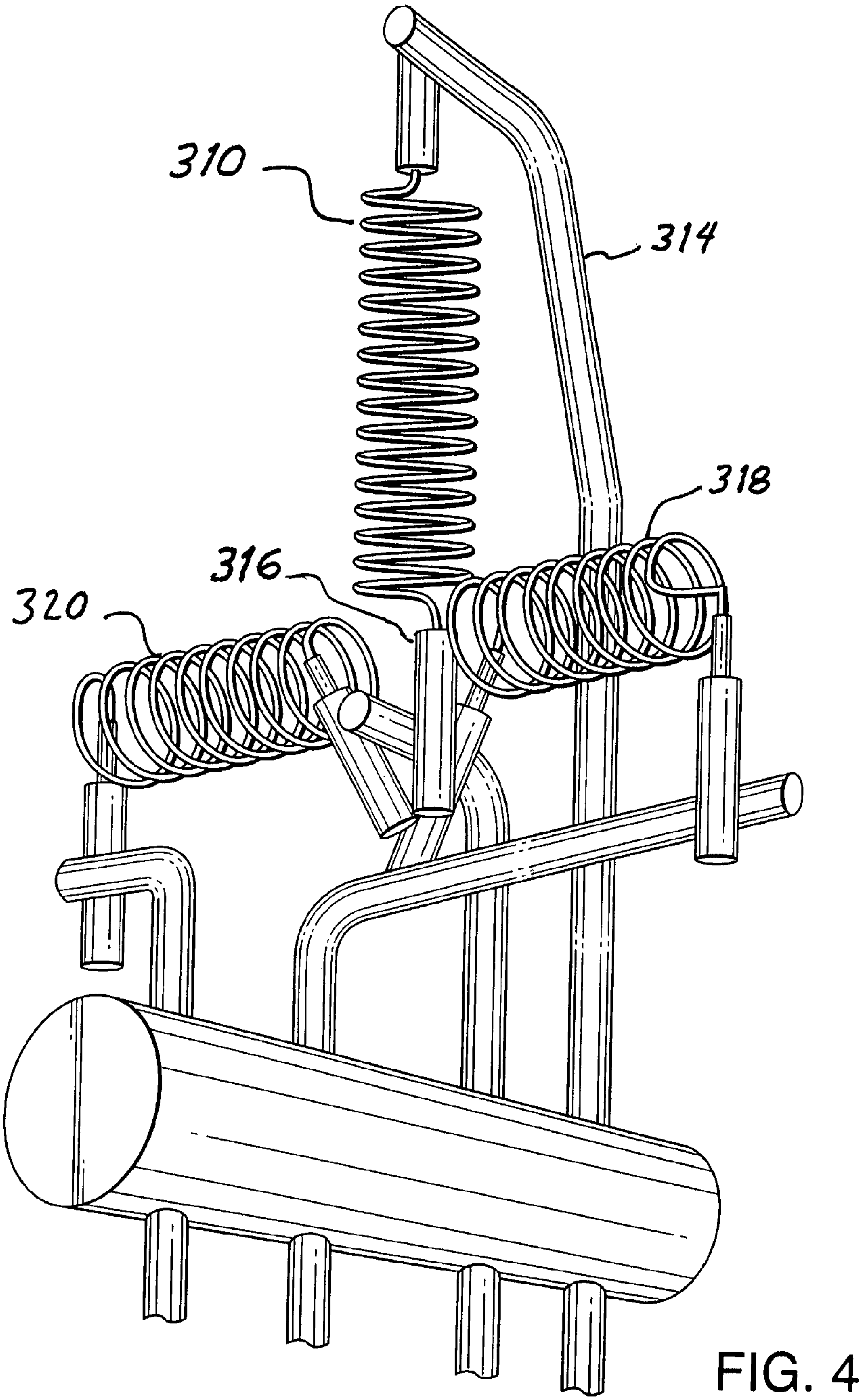
FIG. 4 shows a detailed schematic view of an alternative embodiment of a multi-filament arrangement for a bending beam headlamp.

FIG. 3 shows a schematic view of a preferred embodiment of an alternative multi-filament arrangement for a bending beam headlamp. FIG. 4 shows a detailed schematic view of a preferred embodiment of a multi-filament arrangement for a bending beam headlamp. The first filament 100 is a coiled wire axially 102 aligned with a front end facing the field to be illuminated, and rear end facing a base 132. The first filament 100 is mechanically and electrically supported between a first support 104 and a second support 106. Roughly perpendicular to the first filament 100 is a right side filament 110. The right side filament 110 is a coiled wire whose axis 112 that is angled forward at an angle of 80 degrees to the first filament axis 102. The right side filament 110 is coupled mechanically and electrically between the second support 114 and in common with the second support 106. The right side filament 110 forms an 80-degree angle with the first filament 100 at the rear end of the first filament 100. Roughly perpendicular to the first filament 100 is a left side filament 120. The left side filament 120 is a coiled wire whose axis 122 is similarly angled forward at an angle of 80 degrees to the first filament axis 102. The left side filament 120 is coupled mechanically and electrically between a second support 124 and in common with the second support 106. The left side filament 120 forms an 80-degree angle with the first filament 100 at the rear end of the first filament 110. The first support 104, second support 106, third support 114, and fourth support 116 may be captured in a glass bridge 130, and then extended through a press sealed 132 end (base end) of the lamp envelope for electrical connection on the lamp exterior.

Figure 5:
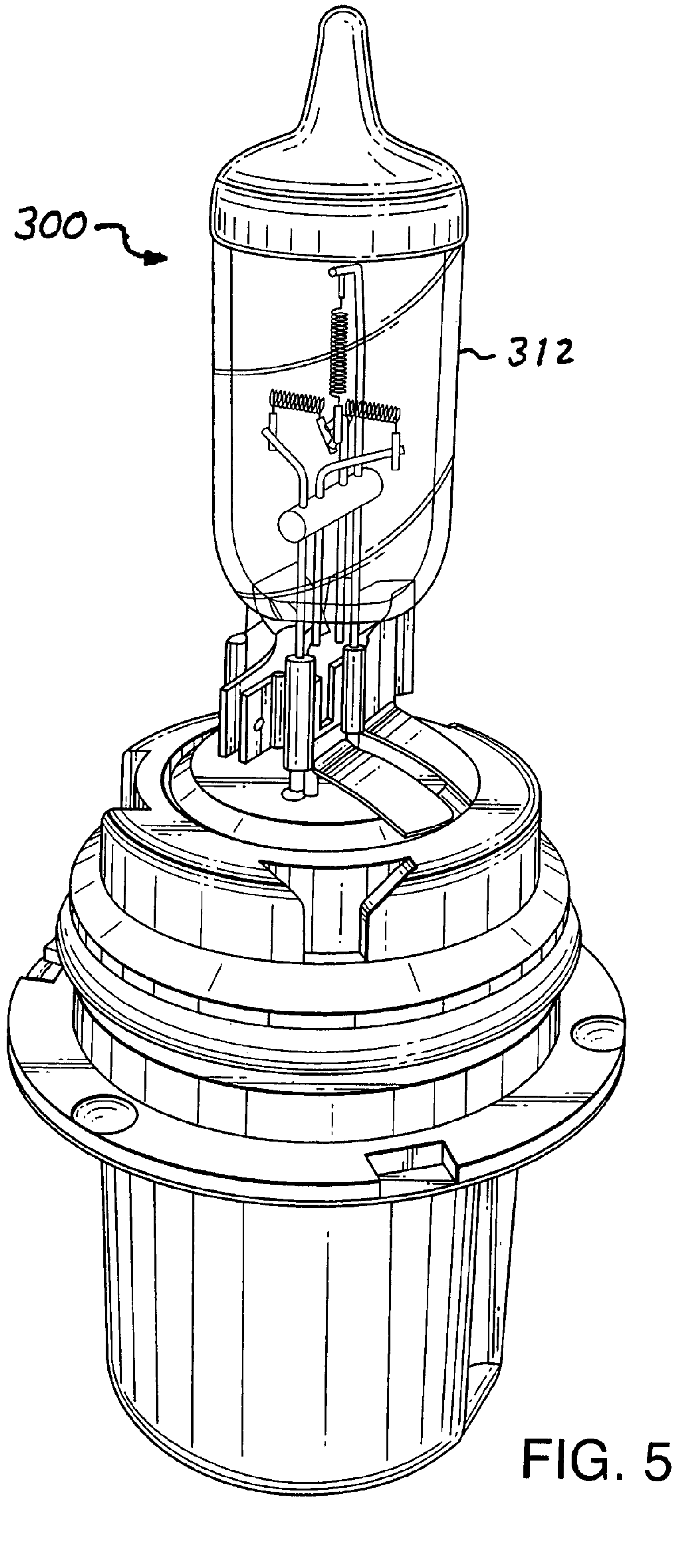
FIG. 5 shows a perspective view of an alternative automotive headlamp bulb with a multi-filament arrangement for a bending beam headlamp.

The lamp is operated by supplying electrical energy to the first filament to generate light. The light generated by the first filament (50, 100) is then directed by the reflector to be centered about a desired point in the field to be illuminated. When the vehicle is steered under a first condition to a one side relative to the beam generated by the first filament (50, 100), a first turning signal is generated that is used to signal the supply of electrical energy to the second filament (60, 110). The actual first turning signal may be generated as a function of one or more steering factors such as an absolute change, a rate of change, a duration of change, a time integrated change, some other signal indicating a change in the vehicle relative to the environment or a computed combination of such factors. The vehicle condition change signal is then used to drive the electrical energy supplied to the second filament (60, 110) or to the third filament (70, 120). For example, if the vehicle is turned to the right, the second filament (60, 110) located on the left of the first filament is turned on to generate light that is then reflected by the reflector to the right side (assuming an inverting reflector) of the beam pattern generated by the first filament (50, 100) and the reflector. It is understood there may be beam over lap between the reflected beam from the first filament, and the reflected beam from the second filament. The sensed actual turn on signal may be conditioned by other computed factors, such as the angle of turn, rate of turn, duration of turn angle, vehicle speed of or other measured or computed factors. The light from the second filament (60, 110) then further illuminates the right side of the field to be illuminated in the region where the vehicle is turning to. The third filament (70, 120) may be farther to the left of the first filament and the second filament (60, 110), and is sequentially illuminated when the turning factors indicate still more light is needed even farther to the right, for example when a particularly sharp turn is made and extra light is desired far to the side of the first beam pattern. Alternatively, the third filament (70, 120) may be located on the right side of the first filament (50, 100), which is on the opposite side of the first filament (50, 110) relative to the second filament (60, 110). The third filament (70, 120) may then be similarly connected to be illuminating when a left turn (opposite to a right turn) is sensed. Again the third filament (70, 120) may respond to the turn angle, the rate of turn, the duration of the turn a so on. In this way the main beam of the first filament is supplemented by the light from the second or third filaments, directed substantially in the same plane or planes, as is light for the first filament, but to a side of the center of the beam from the first filament. FIG. 5 shows a perspective view of an alternative automotive headlamp bulb with a multi-filament arrangement for a bending beam headlamp.

FIG. 4 and FIG. 5 show a schematic side view of an alternative AFS lamp 300. The main filament 310 is axially aligned and centered in the forward end of the envelope 312 supported from two leads 314, 316. The right filament 318 and the left filament 320 are axially aligned, and offset sequentially rearward of the main filament 310 along the axis. The right filament 318 and left filament 320 may share a lead with the main filament 310 for mechanical and electrical coupling. The right filament 318 and left filament 320 may be offset side to side from the main axis. The right filament 318 and left filament 320 may also be tilted with respect to the main axis.

Figure 6:
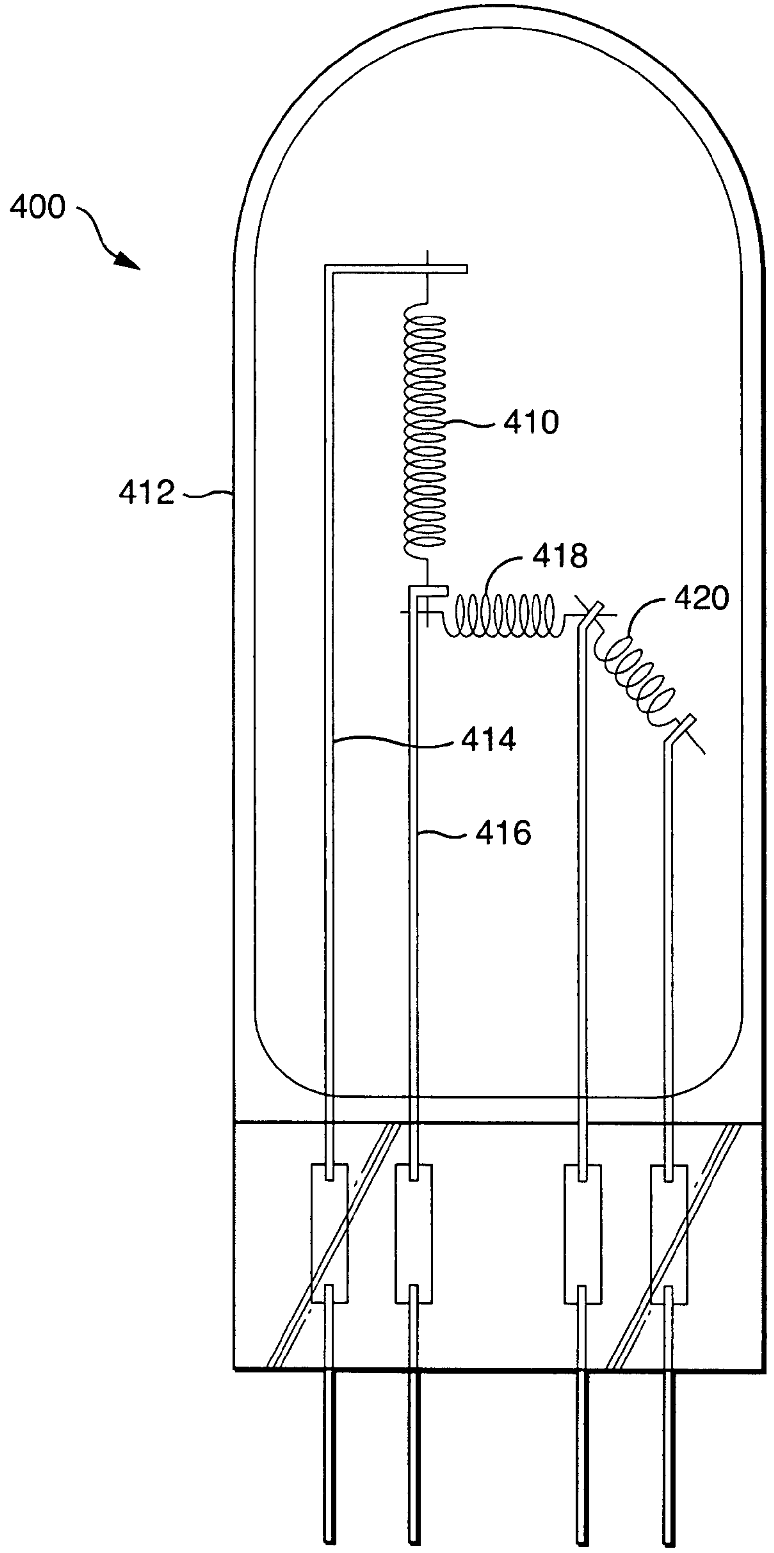
FIG. 6 shows a schematic view of an alternative embodiment of a multi-filament arrangement for a bending beam headlamp.

FIG. 6 shows a schematic view of an alternative AFS lamp 400. The main filament 410 is axially aligned in the forward end of the envelope 412 supported from two leads 414, 416. The second filament 418 and the third filament 420 are radially aligned in sequence rearward of the main filament 410. The second filament 418 and third filament 420 may be share a lead (416) with the main filament 410 for mechanical and electrical coupling. The second filament 418 and third filament 420 may be offset from the main axis. The second filament 418 and third filament 420 may also be tilted with respect to the main axis. The second filament is show to be perpendicular to the main filament 410, while the third filament 420 is shown to be at an angle to both the main filament 410 and the second filament 418. In operation, with both augmenting filaments (418, 420) on one side of the main filament 410, the main filament 410 is operated to generate a center beam pattern. With a moderate turn to one side, the second filament 418 is additionally illuminated providing more light to one side of the center beam. With a greater turning, the third filament 420 is illuminated providing additional light farther to one side of the main beam. The vehicle then may be equipped to either two headlamps each with center, right augmentation and left augmentation filaments; or one right headlamp with a center, soft right augmentation and hard right augmentation filaments and one left headlamp with center, soft left augmentation and hard left augmentation filaments.

It is understood the main filament axis need not be axially centered along the main axis of the envelope, but may be radially offset from the main envelope axis. It is also understood that the lamp may be reoriented with respect to the field to be illuminated by restructuring the headlamp reflector accordingly. In general the second filament and the third filament may be positioned around the lamp axis in any position, given that the associated surrounding reflector directs the associated light appropriately to the right and left sides of the filed to be illuminated accordingly. One simple variation is to rotate the lamp 180 degrees, and rework the reflector to project the light from right (now left) and left (now right) side filaments across the beam axis line to the respective opposite sides of the illuminated field. More complex redirections can be achieved with a vertical orientation, that is changing from a 3 o'clock to 9 o'clock orientation to a 12 o'clock to 6 o'clock orientation or any intermediate orientation. While there have been shown and described what are at present considered to be the preferred embodiments of the invention, it will be apparent to those skilled in the art that various changes and modifications can be made herein without departing from the scope of the invention defined by the appended claims.

What is claimed is:

1. A bending beam vehicle headlamp with a multi-filament bulb comprising:

a reflector having a reflective surface, the reflective surface providing a headlamp beam pattern from a main light source;

a lamp bulb having a horizontally extending axis directed to a field to be illuminated, and a light transmissive wall defining an enclosed volume and enclosing a first filament, a second filament, and a third filament the lamp bulb positioned relative to the reflector so the first filament is positioned relative to the reflector to direct light centered on an axis as a main beam and;

the second filament displaced to a side of the first filament, and positioned relative to the reflector to direct light, by means of the reflector, centered to a horizontal side of the light projected by the reflector from the first filament;

the third filament horizontally displaced to a side of the first filament, and positioned relative to the reflector to direct light, by means of the reflector, centered to a horizontal side of the light projected by the first filament;

electrical connections sealed through the wall and joined respectively to the first, the second and the third filaments to selectively power the respective first filament, the second filament and the third filament, and a control system responding to a vehicle turning signal to provide power to the second filament for a first turning condition and to provide power to the third filament for a second turning condition.

2. The bending beam headlamp with multi-filament bulb in claim 1, wherein the first filament, the second filament are in a common plane.

3. The bending beam headlamp with multi-filament bulb in claim 2, wherein the second filament is positioned to be substantially behind the first filament.

4. The bending beam headlamp with multi-filament bulb in claim 2, wherein the first filament, the second filament and the third filament are in a common plane.

5. The bending beam headlamp with multi-filament bulb in claim 3, wherein the third filament is positioned to be substantially behind the first filament.

6. A incandescent lamp capsule comprising:

an envelope having a light transmissive wall defining an enclosed volume;

a first filament positioned in the enclosed volume and having a first filament axis directed in a forward direction, a second filament positioned in the enclosed volume and defining a second filament axis, the second filament axis being in a common plane with the first filament axis; the second filament axis extending with a directional component perpendicular to the first axis; and a third filament positioned in the enclosed volume and defining a third filament axis, the third filament axis being in the same common plane with the first filament axis and the second filament axis; the third filament axis extending with a directional component perpendicular to the first axis; and electrical connections sealed through the wall and joined respectively to the first filament, the second filament and the third filament to selectively power the respectively the first filament, the second filament and the third filament.

7. An incandescent lamp capsule comprising:

an envelope having a light transmissive wall defining an enclosed volume, and a lamp axis;

a first filament positioned in the enclosed volume and having a first filament axis, the first filament oriented so the first filament axis is in an axial plane parallel with the lamp axis;

a second filament positioned in the enclosed volume and defining a second filament axis, the second filament oriented so the second filament axis is in the axial plane; and the second filament axis is not parallel to the first filament axis; and a third filament positioned in the enclosed volume and defining a third filament axis, the third filament oriented so the third filament axis is in the axial plane with the first filament axis and the second filament axis, the third filament axis is not parallel to the first filament axis and the third filament axis is not parallel to the second filament axis.

8. The incandescent lamp capsule in claim 7, wherein the second filament is substantially behind the first filament.

9. The incandescent lamp capsule in claim 8, wherein the third filament is substantially behind the first filament.

10. The incandescent lamp capsule in claim 7, wherein the second filament is on a side of the first filament; and the third filament is on the same side of the first filament.

11. The incandescent lamp capsule in claim 10, wherein the second filament is substantially behind the first filament.

12. The incandescent lamp capsule in claim 11, wherein the third filament is substantially behind the first filament.

13. The incandescent lamp capsule in claim 7, wherein the second filament is oriented so the second filament axis is perpendicular to the first filament axis.

14. The incandescent lamp capsule in claim 13, wherein the third filament is oriented so the third filament axis is perpendicular to the first filament axis.

15. The incandescent lamp capsule in claim 7, wherein the second filament is on a first side of the first filament; and the third filament is on a second side of the same side of the first filament, opposite the first side of the first filament.

16. The incandescent lamp capsule in claim 15, wherein the second filament is substantially behind the first filament.

17. The incandescent lamp capsule in claim 16, wherein the third filament is substantially behind the first filament.

18. The incandescent lamp capsule in claim 15, wherein the second filament is oriented so the second filament axis is perpendicular to the first filament axis.

19. The incandescent lamp capsule in claim 18, wherein the third filament is oriented so the third filament axis is perpendicular to the first filament axis.

20. The incandescent lamp capsule in claim 7, having electrical connections sealed through the wall and joined respectively to the first filament, the second filament and the third filament to selectively power the respectively the first filament, the second filament and the third filament.

21. The incandescent lamp capsule in claim 20, wherein the first filament has a first electrical connection, and a second electrical connection;

the second filament has a first electrical connection, and a second electrical connection;

the third filament has a first electrical connection, and a second electrical connection; wherein the respective first electrical connections of the first filament, the second filament, and the third filament have a common electrical connection; and wherein;

the respective second electrical connections of the first filament, the second filament, and the third filament have no common electrical connection.

22. An incandescent lamp capsule comprising:

an envelope having a light transmissive wall defining an enclosed volume, and a lamp axis;

a first filament positioned in the enclosed volume and having a first filament axis, the first filament oriented so the first filament axis is in an axial plane parallel with the lamp axis; and a second filament positioned in the enclosed volume and defining a second filament axis, the second filament oriented so the second filament axis is in the axial plane and the second filament axis is substantially perpendicular to the first filament axis.

23. The incandescent lamp capsule in claim 22, wherein the second filament is substantially behind the first filament.

24. A method of operating a vehicle headlamp comprising the steps of:

providing a light directing optical system to direct light from a light source to a field to be illuminated;

providing a single lamp with a light transmissive capsule enclosing a first filament, the capsule positioned in the light directing optical system so as to direct light from the first filament about a desired center beam axis of the field to be illuminated, the lamp capsule having a second filament, the second filament displaced in the lamp capsule from the first filament;

providing a first electrical power to the first filament on a first condition to generate light directed by the optical system substantially about the desired center beam axis of the field to be illuminated;

providing a second condition signal in response to a change in a vehicle condition relative to the exterior environment; and in response to the second condition signal, simultaneously providing electrical power to the second filament to generate light directed by the optical system about a desired beam to a side of the desired center beam axis.

25. An incandescent lamp capsule comprising:

an envelope (20; 312; 412) having a light transmissive wall defining an enclosed volume, and a lamp axis;

a first filament (50; 100; 310; 410) positioned in the enclosed volume and having a first filament axis (52; 102), the first filament oriented so the first filament axis is in an axial plane parallel with the lamp axis; and a second filament (60, 70; 120, 110; 320, 318; 418, 420) positioned in the enclosed volume and defining a second filament axis (62, 72; 122, 112), the second filament oriented so the second filament axis is in the axial plane and the second filament axis is not parallel to the first filament axis;

wherein said second filament is electrically and supportingly coupled to an outer second filament support (69, 78; 124, 114;) and an inner second filament support (68, 79; 106; 416);

wherein said outer second filament support is spaced from the first filament axis, said outer second filament support being further from said first filament axis than is said inner second filament support; and wherein a light producing region of the second filament extending in a direction from said outer second filament support towards said inner second filament support does not extend beyond said first filament axis.

26. The incandescent lamp capsule in claim 25, wherein the second filament is substantially behind the first filament.

27. The incandescent lamp capsule in claim 25, wherein the second filament axis is substantially perpendicular to the first filament axis.

* * * * *